(12) United States Patent
Hayes

(10) Patent No.: US 6,210,764 B1
(45) Date of Patent: *Apr. 3, 2001

(54) FILM WITH SUBSTRATE LAYER CONTAINING ANTIBLOCKING AGENT

(75) Inventor: Gary J. Hayes, Anderson, SC (US)

(73) Assignee: Cryovac, Inc., Duncan, SC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/706,993

(22) Filed: Aug. 29, 1996

(51) Int. Cl.$^7$ .................................................. B32B 27/32
(52) U.S. Cl. ........................ 428/34.9; 428/144; 428/500; 428/516; 428/523; 428/910
(58) Field of Search ........................... 428/515, 516, 428/412, 475.8, 483, 480, 500, 523, 910, 142, 143, 147, 34.9

(56) References Cited

U.S. PATENT DOCUMENTS

| | | | |
|---|---|---|---|
| 2,686,744 | 8/1954 | Cornwell et al. | 154/50 |
| 2,864,783 | 12/1958 | Cornwell et al. | 260/285 |
| 3,340,092 | 9/1967 | Craver et al. | 117/145 |
| 3,491,038 | 1/1970 | Sineath et al. | 260/17 |
| 3,538,029 | 11/1970 | Gross | 260/23 |
| 3,788,881 | 1/1974 | Tellier | 117/73 |
| 3,870,549 | 3/1975 | Ruygrok | 117/73 |
| 3,928,697 | 12/1975 | Mallinson et al. | 428/142 |
| 4,242,396 | 12/1980 | Wilson et al. | 428/141 |
| 4,348,447 | 9/1982 | Miller, Jr. et al. | 428/149 |
| 4,769,418 | 9/1988 | Mizuno et al. | 525/106 |
| 4,842,930 | 6/1989 | Schinkel et al. | 428/349 |
| 5,108,834 | * 4/1992 | Asazuma | 428/323 |
| 5,128,212 | * 7/1992 | Kneale et al. | 428/516 |
| 5,151,317 | 9/1992 | Bothe | 428/216 |
| 5,262,219 | 11/1993 | Yamamoto et al. | 428/141 |
| 5,271,979 | * 12/1993 | Kondo et al. | 428/35.2 |
| 5,372,882 | * 12/1994 | Peiffer et al. | 428/34.9 |
| 5,389,422 | 2/1995 | Okazaki et al. | 428/141 |
| 5,413,835 | 5/1995 | Ikeda et al. | 428/141 |
| 5,425,990 | 6/1995 | Blum et al. | 428/337 |
| 5,427,867 | 6/1995 | Kogure et al. | 428/611 |
| 5,433,983 | 7/1995 | Schuhmann et al. | 428/357 |
| 5,498,474 | * 3/1996 | Schuhmann et al. | 428/323 |
| 5,516,574 | 5/1996 | Ogawa et al. | 428/143 |
| 5,560,753 | 10/1996 | Schnabel et al. | 51/295 |
| 5,605,660 | 2/1997 | Buongiorno et al. | 264/456 |
| 5,614,297 | * 3/1997 | Velazquez | 428/218 |

FOREIGN PATENT DOCUMENTS

| | | |
|---|---|---|
| 41 41 989 A1 | 6/1993 | (DE) . |
| 242055 | 10/1987 | (EP) . |
| 402100 | 12/1990 | (EP) . |
| 0 468 333 A2 | 1/1992 | (EP) . |
| 5-24158 | * 2/1993 | (JP) . |

* cited by examiner

Primary Examiner—Paul Thibodeau
Assistant Examiner—D. Lawrence Tarazano
(74) Attorney, Agent, or Firm—Mark B. Quatt; Daniel B. Ruble

(57) ABSTRACT

A film includes a first outer layer comprising a polymeric material; a second outer layer including a polymeric material; and a substrate layer disposed between the first and second outer layers. The substrate layer includes a polymer and an antiblocking agent. Additional internal layers can be included, some or all of which can include a polymer and an antiblocking agent.

16 Claims, 1 Drawing Sheet

FILM WITH SUBSTRATE LAYER CONTAINING ANTIBLOCKING AGENT

FIELD OF THE INVENTION

The present invention relates generally to multilayer films, and particularly to packaging films. The present invention also relates to packages, especially packages having one or more seals, as well as packaged products.

BACKGROUND OF THE INVENTION

For some time it has been known to provide a packaging film which contains antiblocking agents, such as particulate silica, in one or both outside layers of the film. These antiblocking agents offer two advantages. First, they help to prevent the film from sticking or blocking to itself when the film is rolled up on itself during the manufacture of the film. Second, the antiblock offers a beneficial "roller bearing" effect when the film is run across metal parts in typical commercial packaging equipment. An example of such equipment is a Doboy™ horizontal form/fill/seal machine.

Fatty acid amides, sometimes referred to as slip agents, are often also included in the film, in order to provide the film with a desirable film-to-film coefficient of friction, so that packaged products slide freely when in contact with one another. This is desired in order to facilitate alignment of packaged products for the bulk packaging thereof, for example in boxes, as well as providing a desired low film-to-equipment coefficient of friction.

Unfortunately, antiblock particulates on the surface of the film, as well as fatty acid amides, are believed to often slough off of the film and accumulate on the metal parts of food packaging machines. This undesirable build up on the metal surfaces sometimes results in scratching of the film. In extreme cases, tearing of the film occurs, rendering it unfit for its commercial purpose. The metal parts must be cleaned. This of course interrupts the continuous operation of the equipment, thereby increasing cost of production.

Abrasion of machine parts can also result from the use of films containing antiblocking agents in the surface layer, akin to the use of sandpaper on a metal surface.

In addition, the possibility exists for sluffing off of the antiblocking agent into the product being packaged in the film.

It is thus desirable to reduce or eliminate the presence of antiblocking agent on the surface of the film, while still providing the benefits offered by such agents.

SUMMARY OF THE INVENTION

As a first aspect, the present invention relates to a multilayer film comprising a first outer layer comprising a polymeric material; a second outer layer comprising a polymeric material; and a substrate layer, disposed between the first and second outer layers, comprising a polymeric material and an antiblocking agent.

As a second aspect, the present invention relates to a multilayer film comprising a first outer layer comprising a polymeric material; a second outer layer comprising a polymeric material; a core layer, disposed between the first and second outer layers, comprising a polymeric material; and a first substrate layer, disposed between the core layer and the first outer layer, comprising a polymeric material and an antiblocking agent.

Optionally, one or more additional substrate or internal layers can be included in the film structure of the invention.

DETAILED DESCRIPTION OF THE INVENTION

Figure 2:
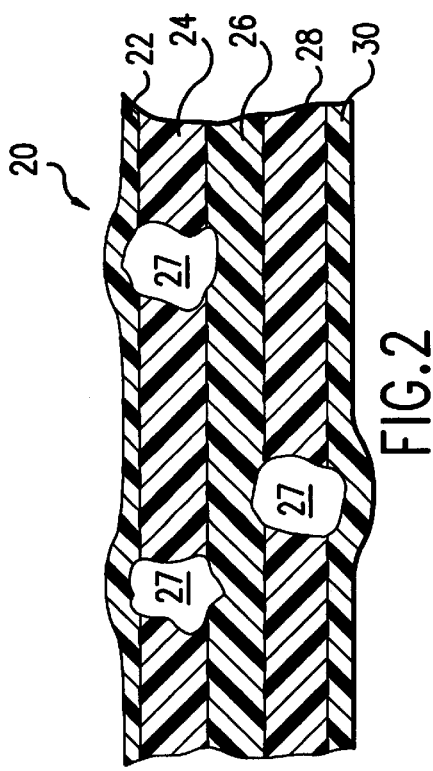
FIGS. 1 to 4 schematically illustrate cross-sectional views of multilayer films according to the present invention.

As used herein, the term "film" is used in a generic sense to include a web, film, sheet, laminate, or the like, whether coextruded, extrusion laminated, extrusion coated, conventionally laminated, or otherwise produced by any other process.

As used herein, "antiblocking agent" refers to an additive that is incorporated into a film to prevent the surface of a film from sticking to itself or other surfaces. These are organic or inorganic materials that, when included in a layer of a film, affect the final film surface topography on at least one outside surface of the film. It has been discovered that antiblocking agents can be incorporated in the substrate layer of a multilayer film, yet still create protrusions or roughness on at least one of the outer surfaces of the film. This occurs because of the presence of the antiblocking agent, which results in a deformation of the adjacent outer layer, causing the polymer of the outer layer to be displaced in portions of the outer layer near the antiblocking material. It is believed that in accordance with the invention, a majority of the individual antiblocking agent particles or units will be encapsulated within the polymer of the substrate and adjacent layers of the film. Thus, these particles or units will typically not break the outer surfaces of the film. It is theorized that these particles or units are "shrouded" by the surrounding polymers, and therefore less likely to slough off or dislodge from the film during a commercial packaging process. Yet, because of the roughness described above, achieved by the spatial impact of the presence of the antiblocking agent, the benefits traditionally associated with the use of antiblocking agents are substantially retained.

As used herein, the phrases "seal layer", "sealing layer", "heat seal layer", "sealant layer", and the like, refer to an outer film layer, or layers, involved in the sealing of the film to itself, another film layer of the same or another film, and/or another article which is not a film. Sealing can be performed by many means, such as using a hot wire, hot knife, heated bar, hot air, infrared radiation, ultrasonic sealing, etc.

As used herein, the term "oriented" refers to a polymer-containing material which has been stretched at an elevated temperature (the orientation temperature), followed by being "set" in the stretched configuration by cooling the material while substantially retaining the stretched dimensions. Upon subsequently heating unrestrained, unannealed, oriented polymer-containing material to its orientation temperature, heat shrinkage is produced.

As used herein, the term "monomer" refers to a relatively simple compound, usually containing carbon and of low molecular weight, which can react to form a polymer by combining with itself or with other similar molecules or compounds.

As used herein, the term "comonomer" refers to a monomer which is copolymerized with at least one different monomer in a copolymerization reaction, the result of which is a copolymer.

As used herein, the term "polymer" refers to the product of a polymerization reaction, and is inclusive of homopolymers, copolymers, terpolymers, etc. In general, the layers of a film can consist essentially of a single polymer, or can have still additional polymers together therewith, i.e., blended therewith.

As used herein, the term "homopolymer" is used with reference to a polymer resulting from the polymerization of a single monomer, i.e., a polymer consisting essentially of a single type of repeating unit.

As used herein, the term "copolymer" refers to polymers formed by the polymerization reaction of at least two different monomers. For example, the term "copolymer" includes the copolymerization reaction product of ethylene and an alpha-olefin, such as 1-hexene. However, the term "copolymer" is also inclusive of, for example, the copolymerization of a mixture of ethylene, propylene, 1-hexene, and 1-octene.

As used herein, the term "polymerization" is inclusive of homopolymerizations, copolymerizations, terpolymerizations, etc., and includes all types of copolymerizations such as random, graft, block, etc.

As used herein, the term "copolymerization" refers to the simultaneous polymerization of two or more monomers.

As used herein, a copolymer identified in terms of a plurality of monomers, e.g., "propylene/ethylene copolymer", refers to a copolymer in which either monomer may copolymerize in a higher weight or molar percent than the other monomer or monomers.

As used herein, copolymers are identified, i.e., named, in terms of the monomers from which the copolymers are produced. For example, the phrase "propylene/ethylene copolymer" refers to a copolymer produced by the copolymerization of both propylene and ethylene, with or without additional comonomer(s).

As used herein, terminology employing a "/" with respect to the chemical identity of a copolymer (e.g., "an ethylene/alpha-olefin copolymer"), identifies the comonomers which are copolymerized to produce the copolymer. As used herein, "ethylene alpha-olefin copolymer" is the equivalent of "ethylene/alpha-olefin copolymer."

As used herein, the phrase "heterogeneous polymer" refers to polymerization reaction products of relatively wide variation in molecular weight and relatively wide variation in composition distribution, i.e., typical polymers prepared, for example, using conventional Ziegler-Natta catalysts. Heterogeneous polymers are useful in various layers of the film used in the present invention. Although there are a few exceptions (such as TAFMER™ linear homogeneous ethylene/alpha-olefin copolymers produced by Mitsui Petrochemical Corporation, using Ziegler-Natta catalysts), heterogeneous polymers typically contain a relatively wide variety of chain lengths and comonomer percentages.

As used herein, the phrase "heterogeneous catalyst" refers to a catalyst suitable for use in the polymerization of heterogeneous polymers, as defined above. Heterogeneous catalysts are comprised of several kinds of active sites which differ in Lewis acidity and steric environment. Ziegler-Natta catalysts are heterogeneous catalysts. Examples of Ziegler-Natta heterogeneous systems include metal halides activated by an organometallic co-catalyst, such as titanium chloride, optionally containing magnesium chloride, complexed to trialkyl aluminum, as is disclosed in patents such as U.S. Pat. No. 4,302,565, to GOEKE, et. al., and U.S. Pat. No. 4,302,566, to KAROL, et. al., both of which are hereby incorporated, in their entireties, by reference thereto.

As used herein, the phrase "homogeneous polymer" refers to polymerization reaction products of relatively narrow molecular weight distribution and relatively narrow composition distribution. Homogeneous polymers are useful in various layers of the multilayer film used in the present invention. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysts, rather than using Ziegler Natta catalysts.

More particularly, homogeneous ethylene/alpha-olefin copolymers may be characterized by one or more methods known to those of skill in the art, such as molecular weight distribution ($M_w/M_n$), composition distribution breadth index (CDBI), and narrow melting point range and single melt point behavior. The molecular weight distribution ($M_w/M_n$), also known as polydispersity, may be determined by gel permeation chromatography. The homogeneous ethylene/alpha-olefin copolymers useful in this invention generally have ($M_w/M_n$) of less than 2.7; preferably from about 1.9 to 2.5; more preferably, from about 1.9 to 2.3. The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes the homogeneous copolymers used in the present invention (narrow composition distribution as assessed by CDBI values generally above 70%) from VLDPEs available commercially which generally have a broad composition distribution as assessed by CDBI values generally less than 55%. The CDBI of a copolymer is readily calculated from data obtained from techniques known in the art, such as, for example, TREF as described, for example, in Wild et. al., *J. Poly. Sci. Poly. Phys. Ed.,* Vol. 20, p.441 (1982). Preferably, the homogeneous ethylene/alpha-olefin copolymers have a CDBI greater than about 70%, i.e., a CDBI of from about 70% to 99%. In general, the homogeneous ethylene/alpha-olefin copolymers in the multilayer films of the present invention also exhibit a relatively narrow melting point range, in comparison with "heterogeneous copolymers", i.e., polymers having a CDBI of less than 55%.

A homogeneous ethylene/alpha-olefin copolymer can, in general, be prepared by the copolymerization of ethylene and any one or more alpha-olefin. Preferably, the alpha-olefin is a $C_3$–$C_{20}$ alpha-monoolefin, more preferably, a $C_4$–$C_{12}$ alpha-monoolefin, still more preferably, a $C_4$–$C_8$ alpha-monoolefin. Still more preferably, the alpha-olefin comprises at least one member selected from the group consisting of butene-1, hexene-1, and octene-1, i.e., 1-butene, 1-hexene, and 1-octene, respectively. Most preferably, the alpha-olefin comprises octene-1, and/or a blend of hexene-1 and butene-1.

Processes for preparing and using homogeneous polymers are disclosed in U.S. Pat. No. 5,206,075, U.S. Pat. No. 5,241,031, and PCT International Application WO 93/03093, each of which is hereby incorporated by reference thereto, in its entirety. Further details regarding the production and use of homogeneous ethylene/alpha-olefin copolymers are disclosed in PCT International Publication Number WO 90/03414, and PCT International Publication Number WO 93/03093, both of which designate Exxon Chemical Patents, Inc. as the Applicant, and both of which are hereby incorporated by reference thereto, in their respective entireties.

Still another genus of homogeneous ethylene/alpha-olefin copolymers is disclosed in U.S. Pat. No. 5,272,236, to LAI, et. al., and U.S. Pat. No. 5,278,272, to LAI, et. al., both of which are hereby incorporated by reference thereto, in their respective entireties.

As used herein, the phrase "homogeneous catalyst" refers to a catalyst suitable for use in the polymerization of homogeneous polymers, as defined above. Homogeneous catalysts are also referred to as "single site catalysts", due to the fact that such catalysts typically have only one type of catalytic site, which is believed to be the basis for the homogeneity of the polymers resulting from the polymerization.

As used herein, the term "polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and a non-olefinic comonomer copolymerizable with the olefin, such as vinyl monomers, styrenic monomers, modified polymers thereof, and the like. Specific examples include polyethylene homopolymer, polypropylene homopolymer, polybutene, ethylene/alpha-olefin copolymer, propylene/alpha-olefin copolymer, butene/alpha-olefin copolymer, ethylene/vinyl acetate copolymer, ethylene/ethyl acrylate copolymer, ethylene/butyl acrylate copolymer, ethylene/methyl acrylate copolymer, ethylene/acrylic acid copolymer, ethylene/methacrylic acid copolymer, modified polyolefin resin, ionomer resin, polymethylpentene, olefin/styrene copolymers, etc. Modified polyolefin resin is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, terms identifying polymers, such as "polyamide", "polyester", "polyurethane", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of mixtures, blends, etc. of such polymers with other polymers of a different type. More preferably, however, the polyolefin is the polymerization product of one or more unsubstituted olefins, the polyamide is the polymerization product of one or more unsubstituted amides, etc.

As used herein, the phrase "ethylene alpha-olefin copolymer", and "ethylene/alpha-olefin copolymer", refer to such heterogeneous materials as linear low density polyethylene (LLDPE), and very low and ultra low density polyethylene (VLDPE and ULDPE); and homogeneous polymers such as metallocene-catalyzed EXACT™ linear homogeneous ethylene/alpha olefin copolymer resins obtainable from the Exxon Chemical Company, of Baytown, Tex., and TAFMER™ linear homogeneous ethylene/alpha-olefin copolymer resins obtainable from the Mitsui Petrochemical Corporation. All these materials generally include copolymers of ethylene with one or more comonomers selected from $C_4$ to $C_{10}$ alpha-olefin such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. The heterogeneous ethylene/alpha-olefin commonly known as LLDPE has a density usually in the range of from about 0.91 grams per cubic centimeter to about 0.94 grams per cubic centimeter. Other ethylene/alpha-olefin copolymers, such as the long chain branched homogeneous ethylene/alpha-olefin copolymers available from The Dow Chemical Company, known as AFFINITY™ resins, are also included as another type of homogeneous ethylene/alpha-olefin copolymer useful in the present invention.

In general, the ethylene/alpha-olefin copolymer comprises a copolymer resulting from the copolymerization of from about 80 to 99 weight percent ethylene and from 1 to 20 weight percent alpha-olefin. Preferably, the ethylene/alpha-olefin copolymer comprises a copolymer resulting from the copolymerization of from about 85 to 95 weight percent ethylene and from 5 to 15 weight percent alpha-olefin.

As used herein, the phrase "substrate layer" refers to any layer, of a multilayer film, having both of its principal surfaces directly adhered to another layer of the film. Preferably, the term "substrate layer" refers to a layer adjacent an outer layer.

As used herein, the phrase "outer layer" refers to any film layer of film having less than two of its principal surfaces directly adhered to another layer of the film. In multilayer films, there are two outer layers, each of which has a principal surface adhered to only one other layer of the multilayer film.

As used herein, the phrase "internal layer" refers to a substrate layer.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "coextrusion" refers to the process of extruding two or more materials through a single die with two or more orifices arranged so that the extrudates merge and weld together into a laminar structure before chilling, i.e., quenching. Coextrusion can be employed in film blowing, free film extrusion, and extrusion coating processes.

As used herein, the phrase "machine direction", herein abbreviated "MD", refers to a direction "along the length" of the film, i.e., in the direction of the film as the film is formed during extrusion and/or coating.

As used herein, the phrase "transverse direction", herein abbreviated "TD", refers to a direction across the film, perpendicular to the machine direction.

As used herein, the phrase "free shrink" refers to the percent dimensional change in a 10 cm×10 cm specimen of film, when shrunk at 200° F., with the quantitative determination being carried out according to ASTM D 2732, as set forth in the 1990 *Annual Book of ASTM Standards,* Vol. 08.02, pp.368–371, which is hereby incorporated, in its entirety, by reference thereto. The film according to the present invention preferably has a "total free shrink at 200° F.", i.e., the sum of the free shrink in the machine direction, at 200° F., and the free shrink in the transverse direction, at 200° F., of from about 10 to 80 percent; more preferably, from about 15 to 70 percent; still more preferably, from about 20 to 60 percent, such as 25 to 40 percent. Unless specified otherwise, the phrase "free shrink", as used herein, refers to total free shrink.

In the film according to the present invention, the outer film layers preferably comprise polyolefin. Preferably, the polyolefin comprises at least one member selected from the group consisting of polyethylene and polypropylene. Preferably, the polyethylene comprises at least one member selected from the group consisting of linear low density polyethylene (LLDPE), very low density polyethylene (VLDPE), linear medium density polyethylene (LMDPE), high density polyethylene (HDPE), ethylene/vinyl acetate copolymer (EVA), ethylene/butyl acrylate copolymer (EBA), and homogeneous ethylene/alpha-olefin copolymer. Preferably, the polypropylene comprises at least one member selected from the group consisting of propylene homopolymer, propylene/ethylene random copolymer, propylene/butene copolymer, and propylene/ethylene/butene terpolymer. Preferably, the propylene/ethylene random copolymer comprises ethylene mer in an amount of from about 0.5 to 30 weight percent, based on the weight of the propylene/ethylene random copolymer; more preferably, ethylene mer in an amount of from about 0.5 to 10 percent, and still more preferably, from about 2 to 6 weight percent. The polypropylene may comprise syndiotactic polypropylene.

Although conventional heterogeneous polymers are disclosed in the examples, below, the outer layers may instead, or additionally, comprise homogeneous polymer, such as homogeneous ethylene/alpha-olefin copolymer.

A particularly preferred outer layer comprises propylene/ethylene copolymer, polybutylene, and homopolymer polypropylene. Another particularly preferred outer layer comprises propylene/ethylene random copolymer and polypropylene homopolymer. The outer layer may further comprise butylene homopolymer, i.e., in addition to one or more of the polyolefins described above.

Another preferred outer layer comprises a blend of linear low density polyethylene and ethylene/vinyl acetate copolymer. Linear medium density polyethylene can also be included.

The inner layer(s) of the film preferably comprises ethylene-based polymer, more preferably ethylene/alpha-olefin copolymer, including both heterogeneous ethylene/alpha-olefin copolymer and homogeneous ethylene/alpha-olefin copolymer. Linear low density polyethylene (LLDPE) is a preferred heterogeneous ethylene/alpha-olefin copolymer for use in the core layer.

The antiblocking agent may comprise mineral-based antiblocking agent and/or synthetic-based antiblocking agent. Mineral-based antiblocking agents include both silica-based agents (e.g., diatomaceous earth, quartz, and silica sand), as well as others such as kaolin, talc, feldspar, and calcium carbonate. Synthetic-based antiblocking agents include synthetic silica antiblocking agents, for example gel-type synthetic silica, and precipitated-type synthetic silica.

Preferably, the antiblocking agent comprises at least one member selected from the group consisting of silica, silicate, and glass, and preferably the antiblocking agent is in the form of approximately spherical particles. However, particles of irregular shape, and angular particles, can be used. Preferably, the antiblocking agent comprises at least one member selected from the group consisting of aluminum silicate (clay), silica (silicon dioxide), sodium calcium alumino silicate, magnesium silicate (talc), and calcium silicate; more preferably, at least one member selected from the group consisting of aluminum silicate, silica, sodium calcium alumino silicate, and magnesium silicate; still more preferably, at least one member selected from the group consisting of aluminum silicate, silica, and sodium calcium alumino silicate; yet still more preferably, at least one member selected from the group consisting of aluminum silicate and silica; and yet still more preferably, aluminum silicate. Preferred antiblocking agents are W-410 and JC-30. These materials are described herein.

The antiblocking agent can comprise an organic material such as crosslinked or uncrosslinked organic materials. Examples include polyester, EVOH (ethylene/vinyl alcohol copolymer), nylon 6, nylon 6,6, syndiotactic polystyrene, engineering resins, liquid crystalline polymers, and aromatic nylons. Selecting the appropriate antiblocking agent depends at least in part on the nature of the layer in which the antiblocking agent is present. The Vicat softening point of the organic antiblocking agent should be sufficiently higher than that of the host polymer such that the organic antiblocking agent functions as an antiblocking agent as described herein.

In accordance with the present invention, antiblocking agents have an average particle size (diameter) of from about 0.1 to 10 microns, such as 1 to 8 microns, and 2 to 6 micrometer, and are preferably present at a level of from 0.1 to 6 weight percent, such as 0.2 to 4 wt. %, and 0.3 to 3 wt. %, based on the weight of the substrate layer.

An organosiloxane, i.e., silicone oil, can optionally be included in or on one or more layers of the films of the present invention. The organosiloxane preferably comprises at least one member selected from the group consisting of polydimethylsiloxane, polymethylphenylsiloxane, olefin-modified silicone, polyether (e.g., polyethylene glycol, polypropylene glycol)-modified silicone, olefin/polyether-modified silicone, epoxy-modified silicone, amino-modified silicone, alcohol-modified silicon, etc. Among these, polydimethylsiloxane is preferred.

The organosiloxane is preferably present in the substrate layer in an amount of from about 0.1 to 1.0 weight percent based on the weight of the substrate layer, more preferably in an amount of from about 0.1 to 0.5 weight percent, still more preferably 0.16 to 0.5 weight percent, and yet still more preferably in an amount of 0.18 to 0.5 weight percent.

Optionally, one or more of the outer layers and/or substrate layer(s) includes fatty amide, preferably in an amount of from about 0.1 to 1 percent, based on the weight of the layer; more preferably, from about 0.2 to 0.6 percent; still more preferably, from about 0.2 to 0.4 percent. Preferably, the fatty amide comprises at least one member selected from the group consisting of primary fatty amide, secondary fatty amide, tertiary fatty amide, fatty alkanolamide, and fatty bisamide. More specifically, the fatty amide preferably comprises at least one member selected from the group consisting of erucamide, stearamide, oleamide, behenamide, and ethylene bisstearamide.

Fatty amides are described in detail in Arthur L. McKenna, "Fatty Amides" (1992, Witco Chemical Corporation), which is hereby incorporated by reference thereto, in its entirety.

Although the film preferably has a film-to-film coefficient of friction of from about 0.1 to 0.9, more preferably the film has a film-to-film coefficient of friction of from about 0.1 to 0.7, still more preferably, from about 0.1 to 0.5, and yet still more preferably, from about 0.1 to 0.3.

The film has a total thickness of preferably less than about 20 mils, more preferably the film has a total thickness of from about 0.2 to 10 mils, still more preferably from about 0.3 to 4 mils, and yet still more preferably, from about 0.4 to 2 mils, such as 0.5 to 1 mil.

The measurement of optical properties of plastic films used in packaging, including the measurement of total transmission, haze, clarity, and gloss, is discussed in detail in Pike, LeRoy, "Optical Properties of Packaging Materials", *Journal of Plastic film & sheeting,* Vol. 9, No. 3, pp. 173–180 (July 1993), which is hereby incorporated by reference thereto, in its entirety.

The measurement of all angles of reflected or transmitted light from a sample is called goniophotometry. A Gardner Goniophotometer is capable of determining total transmission, i.e., measuring light striking at any and all angles, and the reflection or transmission of this light from any angle.

The film clarity can be measured using the method of ASTM D 1746, as set forth in the 1990 *Annual Book of ASTM Standards,* Vol. 08.02, pp.76–78, which is hereby incorporated, in its entirety, by reference thereto. Haze can be measured using the method of ASTM D 1003, as is discussed below. Gloss can be measured using the method of ASTM D 2457, as set forth in the 1990 *Annual Book of ASTM Standards,* Vol. 08.02, pp.266–269, which is hereby incorporated, in its entirety, by reference thereto.

Clarity refers to the optical distinctness with which an object can be seen when viewed through the sheet. Clarity may be thought of as the distinctness with which an object appears when viewed through a film. Clarity may also be described as the quality of image formation through a sheet, and depends upon the linearity of the passage of light rays through the material. Small deflections of the light, caused by the scattering centers of the material, bring about a deterioration of the image, i.e., a decrease in clarity, these deflections being much smaller than those registered in haze measurements.

Although the film of the present invention preferably has a clarity of from about 20 percent to 100 percent, more preferably the film has a clarity of from about 40 to 100 percent, still more preferably from about 60 to 100 percent, and still more preferably, from 80 to 100 percent. Some of the multilayer films of the present invention are preferably irradiated to induce crosslinking. In the irradiation process, the film is subjected to an energetic radiation treatment, such as corona discharge, plasma, flame, ultraviolet, X-ray, gamma ray, beta ray, and high energy electron treatment, which induce cross-linking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking the polymer present in the film.

To produce crosslinking, a suitable radiation dosage of high energy electrons, preferably using an electron accelerator, with a dosage level being determined by standard dosimetry methods. Other accelerators such as a Van de Graaff generator or resonating transformer may be used. The radiation is not limited to electrons from an accelerator since any ionizing radiation may be used. The ionizing radiation can be used to crosslink the polymers in the film. Preferably, the film is irradiated at a level of from 2–15 MR, more preferably 2–10 MR. As can be seen from the descriptions of preferred films for use in the present invention, the most preferred amount of radiation is dependent upon the film composition, thickness, etc., and its end use.

The antiblocking agent can be used in a substrate layer or layers, and optionally in one or more other layers of a wide variety of film and sheet materials. More specifically, the antiblocking agent can be used in any one or more of the substrate layers of films disclosed in: U.S. Pat. No. 4,532,189, issued Jul. 30, 1985 to W. B. Mueller; U.S. Pat. No. 4,551,380 issued Nov. 5, 1985 to J. H. Schoenberg; U.S. Pat. No. 4,724,185 issued Feb. 9, 1988 to G. P. Shah; U.S. Pat. No. 4,755,419 issued Jul. 5, 1988 to G. P. Shah; U.S. Pat. No. 5,023,143 issued Jun. 11, 1991 to M. Nelson; U.S. Pat. No. 5,298,302, issued Mar. 29, 1994 to P. R. Boice; and U.S. Pat. No. 5,482,771, issued Jan. 9, 1996 to G. P. Shah. Each of these patents is hereby incorporated by reference thereto, in its entirety.

In addition to the above listed patents, the present invention is especially useful in symmetrical three-layer films, and symmetrical five-layer films, each having propylene-based outer layers and at least one ethylene-based inner layer. Films which can beneficially use the invention include barrier films as well as non-barrier films, irradiated as well as non-irradiated films, symmetrical and non-symmetrical films, films containing adhesive layers, and films containing one or more interior functional layers.

Figure 1:
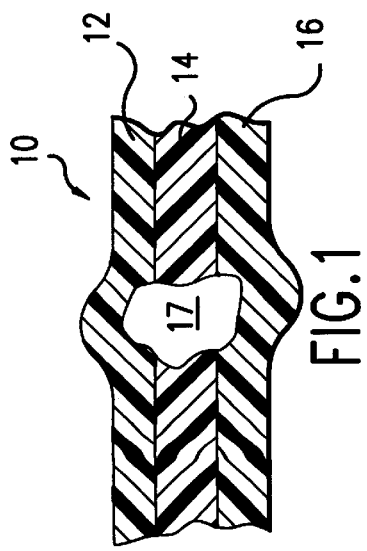

FIG. 1 illustrates a cross-sectional view of a preferred, oriented three-layer film 10. First layer 12 is an outer film layer which can serve as a sealing layer, and either an abuse layer or a product contact layer. Second layer 14 is a substrate film layer which can serve as a bulk layer. Third layer 16 is also an outer layer, and can also serves as a sealing layer as well as an abuse layer or a product contact layer. In the preferred film illustrated in FIG. 1, first layer 12 and third layer 16 are of substantially identical chemical composition and substantially identical thickness, so that multilayer film 10 has a substantially symmetrical cross-section. Outer layers 12 and 16 each comprise a polymeric material, and substrate layer 14 comprises a polymeric material and an antiblocking agent 17.

FIG. 2 shows a film 20 like that of FIG. 1, but including five layers. The antiblocking agent 27 is present in two substrate layers 24 and 28, flanked respectively by the central core layer 26 and outer layers 22 and 30.

Figure 4:
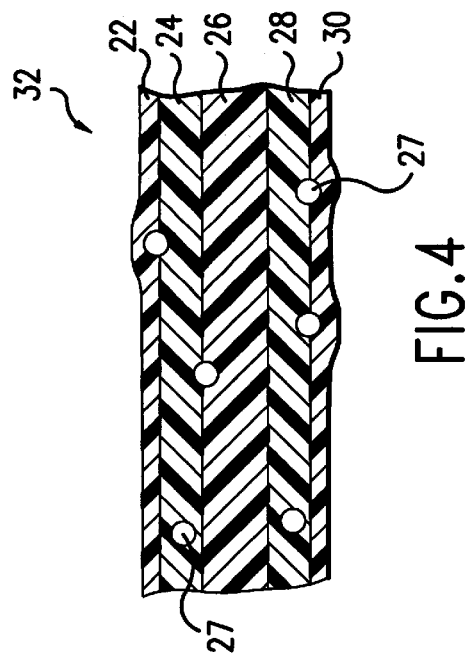
Figure 3:
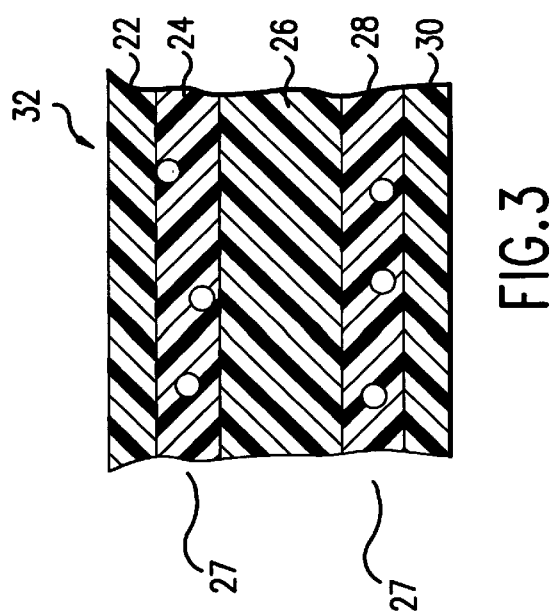

FIG. 3 shows an unoriented five layer film 32; FIG. 4 shows the same film after orientation, and similar to the film of FIG. 2. A preferred method for making the film of the present invention is as set forth in U.S. Pat. Nos. 4,532,189, and 5,298,302, both patents incorporated by reference herein in their entirety. Individual resin components or blends which are to form each layer are fed to extruders. Inside the extruders, the polymer beads are forwarded, melted, and degassed, following which the resulting bubble-free melt is forwarded into a die head, and extruded through an annular die, resulting in a tape, in the form of a tubing, the tape preferably having a thickness of about 5 to 50 mils. The tape is then rapidly cooled to room temperature (optionally by water spray from a cooling ring) and thereafter collapsed by pinch rolls. Although the tape can be irradiated, the tape is preferably not irradiated because polypropylene, a preferred polymer for use in the film, degrades with radiation. However, in the event that the film comprises only polymers which do not degrade upon irradiation, it may be preferred to irradiate the tape. The tape is then heated to a preferred orientation temperature by using a radiant heating means (e.g., infrared radiation) and/or conductive heating means (e.g., superheated steam) and/or convective heating means (e.g., heated air). A preferred orientation temperature is from about 75° C. to 175° C., more preferably from about 90° C. to 160° C. After reaching the desired orientation temperature, the heated tape is directed through pinch rolls, following which the heated tape is inflated, resulting in a trapped bubble. Using this bubble technique, which is well known to those of skill in the art, internal air pressure stretches the heated tape in an amount of from about 1.5× to 8× in the transverse direction (preferably from about 3× to 7×). Simultaneously, roller speed differential, i.e., between the first and second set of pinch rolls, simultaneously draws the heated tape in an amount of from about 1.5× to 8× in the machine direction (preferably from about 3× to 7×). In this manner, a biaxially oriented film 20 is formed. The biaxially oriented film is then rapidly cooled using chilled air, in order to maintain the degree of biaxial orientation. Finally, the biaxially oriented film is wound onto a take-up roll.

EXAMPLES

The invention is illustrated by the following examples, which are provided for the purpose of representation, and are not to be construed as limiting the scope of the invention. Unless stated otherwise, all percentages disclosed herein are based on weight.

The following resins were employed in the Examples set forth below.

PEC: Escorene™ PD 9302 propylene/ethylene random copolymer having 3.3% by weight of ethylene, obtained from the Exxon Chemical Americas, of Houston, Tex.

PB: Duraflex 0 300 ™ polybutylene homopolymer having a density of 0.915 g/cc, obtained from the Shell Chemical Company, of Hahnville, La.

PP: PD 4062E-7 ™ polypropylene homopolymer having a density of 0.90 g/cc, also obtained from the Exxon Chemical Americas.

PBR1 Cefor™ DS4D31 propylene/butene random copolymer with 8% butene from Shell.

PBR2 Cefor™ DS4D05 propylene/butene random copolymer with 14% butene from Shell.

PEB1: KT-221P™ propylene/ethylene/butene random copolymer from Montel Polyolefins USA.

PEB2: KT-021P™ propylene/ethylene/butene random copolymer from Montel Polyolefins USA.

AB1: Zeeospheres W-410™ ceramic microspheres, used as antiblocking agent with spherical shape and average size (diameter) of 4 micrometers from Zeelan Industries.

AB2 Silton JC-30™ metal silicate particles, used as antiblocking agent with average size (diameter) of 3 micrometers, distributed by International Resources, Inc.

AB3 Syloblock S200™, used as antiblocking agent with average size (diameter) of 2 micrometers, from W. R. Grace.

AB4 Zeeospheres W-610™ ceramic microspheres, used as antiblocking agent with spherical shape and average size (diameter) of 6 micrometers.

AB5 Silton JC-50™ metal silicate particles, used as antiblocking agent with average size (diameter) of 5 micrometers.

ABB: KAOPOLITE SFO SPECIAL ™ blend of kaolin silica having an average particle size of 0.7 microns with approximately 4% by weight of fatty acid amides, obtained from Kaopolite, Inc., of Union, N.J.

SO: SF 18-350 ™ polydimethylsiloxane (i.e., silicone oil), obtained from the General Electric Company of Waterford, N.Y.

FA1: KEMAMIDE W-40 ™ N-N'-ethylene-bis-stearamide (a fatty amide), also obtained from the Witco Corp.

FA2: KEMAMIDE E Ultra ™ fatty amide of erucic acid, obtained from the Witco Corp., Humko Chemical Division, of Charlotte, N.C.

FA3: KEMAMIDE B ™ fatty amide of behenic acid, obtained from the Witco Corp., Humko Chemical Division, of Charlotte, N.C.

MO: KAYDOL ™ white mineral oil, also supplied by Witco Corp.

LLDPE: DOWLEX 2045.03 ™ linear low density polyethylene, a heterogeneous ethylene/octene copolymer having a density of 0.920 g/cc and a melt index of 1.1, obtained from The Dow Chemical Company, of Midland, Mich.

PE1: Dowlex™ 2045.04 LLDPE, an ethylene/1-octene copolymer with a density of 0.920 gm/cc and an octene-1 comonomer content of 6.5%.

PE2: Dowlex™ 2037 LMDPE, an ethylene/1-octene copolymer with a density of 0.935 gm/cc. and an octene-1 comonomer content of 2.5%.

EV1: PE 1335 ethylene/vinyl acetate copolymer with 3.3% vinyl acetate monomer, from Rexene.

MBC=masterbatch of approximately 90% by weight of PP, approximately 4% by weight of ABB, and approximately 6% by weight of a blend of fatty acid amides. ("MB" means masterbatch.)

For each of the examples and comparative examples, the film was coextruded. The film was made with silicone oil (i.e., polydimethylsiloxane) sprayed onto the inside surface of the tape, immediately after extrusion. Following extrusion and cooling, the film structure was oriented 5× in the machine direction, and 5× in the transverse direction, using a hot air trapped bubble method. The final oriented film had a thickness of about 0.6 mils.

Comparative Example 1

A film having the following structure and percent layer thicknesses was extruded:

| 72.5% PEC | / | LLDPE | / | 72.5% PEC |
|---|---|---|---|---|
| 15% PB | / | | / | 15% PB |
| 12.5% MBC | / | | / | 12.5% MBC |
| 25% | | 50% | | 25% |

Example 1

A film having the following A/B/C/B/A structure and percent layer thicknesses (10/15/50/15/10) was coextruded:

| |
|---|
| 72.5% PEC + 15% PB + 12.5% MB [94.6% PP + 2.0% FA1 + 3.4% FA2] |
| 72.5% PEC + 15% PB + 12.5% MB [91.4% PP + 2.0% FA1 + 3.4% FA2 + 3.2% AB1] |
| LLDPE |
| 72.5% PEC + 15% PB + 12.5% MB [91.4% PP + 2.0% FA1 + 3.4% FA2 + 3.2% AB1] |
| 72.5% PEC + 15% PB + 12.5% MB [94.6% PP + 2.0% FA1 + 3.4% FA2] |

Example 2

A film having the following A/B/C/B/A structure and percent layer thicknesses (10/15/50/15/10) was coextruded:

| |
|---|
| 72.5% PEC + 15% PB + 12.5% MB [94.6% PP + 2.0% FA1 + 3.4% FA2] |
| 72.5% PEC + 15% PB + 12.5% MB [91.1% PP + 2.0% FA1 + 3.5% FA2 + 3.5% AB2] |
| LLDPE |
| 72.5% PEC + 15% PB + 12.5% MB [91.1% PP + 2.0% FA1 + 3.4% FA2 + 3.5% AB2] |
| 72.5% PEC + 15% PB + 12.5% MB [94.6% PP + 2.0% FA1 + 3.4% FA2] |

Example 3

A film having the following A/B/C/B/D structure and percent layer thicknesses (10/15/50/15/10) was extruded:

| |
|---|
| 72.5% PEC + 15% PB + 12.5% MB [94.6% PP + 2.0% FA1 + 3.4% FA2] |
| 80% PEC + 15% PB + 5% MB [90% PP + 10% AB5] |
| LLDPE |
| 80% PEC + 15% PB + 5% MB [90% PP + 10% AB5] |
| 72.5% PEC + 15% PB + 12.5% MBC |

Comparative Example 2

A monolayer film having the following structure was extruded: 90% PEB1+10% MB [94% PEB2+4% kaolin clay+0.5% erucamide+0.5% behemamide+1% oleamide].

Example 4

A film having the same structure as that of Example 2, but with percent layer thicknesses of 5/15/60/15/5, was extruded.

Example 5

A film having the same structure as that of Example 3 was made, but which was extruded (see below) such that the layer having the formulation:

72.5% PEC+15%PB+12.5%MB[94.6%PP+2.0%FA1+3.4%FA2]

formed the inside surface of the tubular film (on which a silicone was sprayed during extrusion). Contrast this with the film of Example 3, in which the layer having the formulation:

72.5%PEC+15%PB+12.5%MBC formed the inside surface of the tubular film (on which a silicone was sprayed during extrusion).

Comparative Example 3

A commercially available monolayer film, Vanguard F-100™ from Okura, is believed to be a monolayer polyolefinic film.

Comparative Example 4

A film like that of Comparative Example 1 was made.

Comparative Example 5

A film having the following A/B/C structure and percent layer thicknesses (25/50/25) was extruded:

| |
|---|
| 72.5% PEC + 15% PB + 12.5% MB [94.6% PP + 2.0% FA1 + 3.4% FA2] |
| LLDPE |
| 72.5% PEC + 15% PB + 12.5% MBC |

Example 6

A film having the following A/B/C/B/A structure and percent layer thicknesses (10/15/50/15/10) was extruded:

| |
|---|
| 72.5% PEC + 15% PB + 12.5% MB [94.6% PP + 2.0% FA1 + 3.4% FA2] |
| 72.5% PEC + 15% PB + 12.5% MB [91.1% PP + 2.0% FA1 + 3.4% FA2 + 3.5% AB4] |
| LLDPE |
| 72.5% PEC + 15% PB + 12.5% MB [91.1% PP + 2.0% FA1 + 3.4% FA2 + 3.5% AB4] |
| 72.5% PEC + 15% PB + 12.5% MB [94.6% PP + 2.0% FA1 + 3.4% FA2] |

Example 7

A film having the following A/B/C/B/A structure and percent layer thicknesses (15/15/40/15/15) was extruded:

| |
|---|
| 40% PEC + 15% PB + 32.5% PP + 12.5% MB [92.6% PP + 4.0% FA1 + 3.4% FA2] |
| 40% PEC + 15% PB + 32.5% PP + 12.5% MB [91.1% PP + 2.0% FA1 + 3.5% FA2 + 3.5% AB4] |
| LLDPE |
| 40% PEC + 15% PB + 32.5% PP + 12.5% MB [91.1% PP + 2.0% FA1 + 3.4% FA2 + 3.5% AB4] |
| 40% PEC + 15% PB + 32.5% PP + 12.5% MB [92.6% PP + 4.0% FA1 + 3.4% FA2] |

Comparative Example 6

A film having the following A/B/A structure and percent layer thicknesses (20/60/20) was extruded, having a final thickness of 30 gauge:

| 45% PE2 + 40% EV1 + 15% MB [93% PE2 + 7% slip and antiblock] |
|---|
| 60% PE1 + 40% PE2 |
| 45% PE2 + 40% EV1 + 15% MB [93% PE2 + 7% slip and antiblock] |

Comparative Example 7

A film having the following A/B/A structure and percent layer thicknesses (25/50/25) was extruded, having a final thickness of 60 gauge:

| 50% PE1 + 25% PE2 + 25% MB [95% EV1 + 5% slip and antiblock agents] |
|---|
| PE1 |
| 50% PE1 + 25% PE2 + 25% MB [95% EV1 + 5% slip and antiblock agents] |

Example 8

A film like that of Comparative Example 6 is made, but which includes in the core layer (i.e. the central layer of the film) an antiblocking agent.

Example 9

A film like that of Comparative Example 7 is made, but which includes in the core layer (i.e. the central layer of the film) an antiblocking agent.

TABLE 1

| | Build-up (in grams) | | |
|---|---|---|---|
| Example | Roll 1 | Roll 2 | Average |
| Comp. 1 | 0.0349 | 0.0342 | 0.0346 |
| 1 | 0.0034 | 0.0041 | 0.0038 |
| 2 | 0.0002 | 0.0020 | 0.0011 |
| 3 | 0.0044 | 0.0079 | 0.0062 |
| Comp. 2 | 0.0126 | 0.0038 | 0.0110 |
| 4 | 0.0037 | 0.0037 | 0.0037 |
| 5 | 0.0029 | 0.0025 | 0.0027 |
| Comp. 3 | 0.0014 | 0.0051 | 0.0033 |
| Comp. 4 | 0.0257 | 0.0431 | 0.0344 |
| Comp. 5 | 0.0198 | 0.0251 | 0.0225 |
| 6 | 0.0017 | 0.0015 | 0.0016 |
| 7 | 0.0006 | 0.0010 | 0.0008 |
| Comp. 6 | 0.0295 | — | 0.0295 |
| Comp. 7 | 0.0465 | — | 0.0465 |

TEST METHODOLOGY

In a series of in-house tests, a roll of film of each example was unwound, and the film passed over a steel bar. Film tension was maintained to keep the film in contact with the bar. The entire roll was used for each test, approximately 8000 ft for 60 gauge film. The buildup (i.e. aggregation of material on the steel bar) was collected and weighed in grams as reported in the Table above. Usually two rolls of each formulation were run to improve sampling average and to make the comparisons more meaningful. The ideal situation requires that control rolls be used each time film samples are evaluated to eliminate any bias which may result from changes in atmospheric conditions and/or test equipment setup parameters.

Although the present invention has been described in connection with the preferred embodiments, it is to be understood that modifications and variations may be utilized without departing from the principles and scope of the invention.

An fatty acid amide can optionally be present in any of the film layers of films of the present invention, and/or on an outside surface layer of the film. A polyorganosiloxane can optionally be present in any of the film layers of films of the present invention, and/or on an outside surface layer of the film. A mineral oil can optionally be present in any of the film layers of films of the present invention, and/or on an outside surface layer of the film. An antistatic agent can optionally be present in any of the film layers of films of the present invention, and/or on an outside surface layer of the film. An antifogging agent can optionally be present in any of the film layers of films of the present invention, and/or on an outside surface layer of the film.

What is claimed is:

1. A packaged product comprising:
    a package comprising a heat-shrinkable multilayer film comprising:
        a first outer layer formed by extruding polymeric resin that is free of antiblocking agent particles;
        a second outer layer formed by extruding polymeric resin that is free of antiblocking agent particles; and
        disposed between the first and second outer layers, at least one substrate layer that includes at least one polymeric material and antiblocking agent particles, wherein the multilayer film has a total free shrink at 200° F. of from about 10 to 80%; and
    a product within the package.

2. The packaged product of claim 1 wherein the multilayer film has a total free shrink at 200° F. of from about 20 to 60%.

3. The packaged product of claim 1 wherein the multilayer film has a total free shrink at 200° F. of from 25 to 40%.

4. The packaged product of claim 1 wherein the multilayer film is oriented in the transverse direction by a ratio of from about 3:1 to about 7:1.

5. The packaged product of claim 1 wherein the multilayer film is a 3-layer film.

6. The packaged product of claim 1 wherein at least one substrate layer includes one or more polymers selected from the group consisting of polyester, polyamide, polystyrene, and polycarbonate.

7. The packaged product of claim 1 wherein at least one substrate layer includes an ethylene-based polymer selected from the group consisting of ethylene homopolymer, ethylene/alpha-olefin copolymer, ethylene/vinyl acetate copolymer, ethylene/methyl acrylate copolymer, ethylene/ethyl acrylate copolymer, ethylene/butyl acrylate copolymer, ethylene/acrylic acid copolymer and ethylene/methacrylic acid copolymer.

8. The packaged product of claim 1 wherein the antiblocking agent particles have an average diameter of from 5 to 6 microns.

9. The packaged product of claim 1 wherein the antiblocking agent particles have an average diameter of 5 microns or 6 microns.

10. The packaged product of claim 1 wherein at least one of the substrate layers includes from 0.1 to 6 weight percent of antiblocking agent particles, based on the weight of the substrate layer.

11. The packaged product of claim 1 wherein at least one of the substrate layers that includes the antiblocking agent particles is adjacent to at least one of the first and second outer layers.

12. The packaged product of claim 1 wherein the antiblocking agent particles are essentially spherical.

13. The packaged product of claim 1 wherein the multilayer film has a clarity of at least about 60%.

14. The packaged product of claim 1 wherein at least one of the layers further comprises a fatty acid amide.

15. The packaged product of claim 1 wherein the antiblocking agent particles include an organic polymer.

16. A packaged product comprising:

a product; and a package surrounding the product, the package comprising a multilayer film comprising:

a first outer layer formed by extruding polymeric resin that is free of antiblocking agent particles;

a second outer layer formed by extruding polymeric resin that is free of antiblocking agent particles; and disposed between the first and second outer layers, at least one substrate layer that includes:

at least one polymeric material; and from 0.1 to 6 weight percent, based on the weight of the substrate layer, of spherically-shaped antiblocking agent particles;

wherein at least one substrate layer that includes the antiblocking agent particles further includes an ethylene-based polymer selected from the group consisting of ethylene homopolymer, ethylene/alpha-olefin copolymer, ethylene/vinyl acetate copolymer, ethylene/methyl acrylate copolymer, ethylene/ethyl acrylate copolymer, ethylene/butyl acrylate copolymer, ethylene/acrylic acid copolymer, and ethylene/methacrylic acid copolymer; and wherein the multilayer film:

is heat shrinkable by having a total free shrink at 200° F. of from about 10 to 80%;

is oriented in the transverse direction by a ratio of from about 3:1 to about 7:1; and has a clarity of at least about 60%.

* * * * *